United States Patent
Onoue et al.

(10) Patent No.: US 9,318,268 B2
(45) Date of Patent: Apr. 19, 2016

(54) SOLID ELECTROLYTIC CAPACITOR AND MANUFACTURING METHOD THEREFOR

(71) Applicant: MURATA MANUFACTURING CO., LTD., Nagaokakyo-Shi, Kyoto-fu (JP)

(72) Inventors: Tomoaki Onoue, Nagaokakyo (JP); Hiroshi Tokuhara, Nagaokakyo (JP)

(73) Assignee: MURATA MANUFACTURING CO., LTD., Nagaokakyo-Shi, Kyoto-Fu (JP)

( * ) Notice: Subject to any disclaimer, the term of this patent is extended or adjusted under 35 U.S.C. 154(b) by 303 days.

(21) Appl. No.: 13/953,840

(22) Filed: Jul. 30, 2013

(65) Prior Publication Data

US 2014/0055912 A1  Feb. 27, 2014

(30) Foreign Application Priority Data

Aug. 22, 2012  (JP) .................. 2012-183545

(51) Int. Cl.
*H01G 9/028* (2006.01)
*H01G 11/48* (2013.01)
*H01G 9/00* (2006.01)

(52) U.S. Cl.
CPC ............ *H01G 9/028* (2013.01); *H01G 9/0036* (2013.01); *H01G 11/48* (2013.01)

(58) Field of Classification Search
CPC ...... H01G 9/028; H01G 9/0036; H01G 11/48
See application file for complete search history.

(56) References Cited

U.S. PATENT DOCUMENTS

| | | | | |
|---|---|---|---|---|
| 5,914,852 A | * | 6/1999 | Hatanaka | H01G 9/025 361/523 |
| 5,972,052 A | * | 10/1999 | Kobayashi | H01G 9/15 29/25.03 |
| 6,088,218 A | * | 7/2000 | Hamada | H01G 9/0036 252/500 |
| 6,224,639 B1 | | 5/2001 | Hamada et al. | |
| 6,409,777 B2 | * | 6/2002 | Kobatake | 29/25.01 |
| 6,430,032 B2 | * | 8/2002 | Sakai | H01G 9/0036 29/25.03 |
| 7,848,083 B2 | * | 12/2010 | Oohata | H01G 9/042 29/25.03 |
| 8,482,902 B2 | * | 7/2013 | Ishida | H01G 9/0029 361/523 |
| 8,749,955 B2 | * | 6/2014 | Iwai | H01G 9/15 361/523 |
| 8,773,843 B2 | * | 7/2014 | Ode | C08L 65/00 361/517 |
| 2007/0047178 A1 | * | 3/2007 | Saitou | H01G 9/0032 361/523 |

(Continued)

FOREIGN PATENT DOCUMENTS

CN  101329953 A  12/2008
EP  0893807 A2  1/1999

(Continued)

OTHER PUBLICATIONS

Japanese Office Action issued for counterpart application JP 2012-183545, dispatch date Jun. 24, 2014 (with English translation).

*Primary Examiner* — Jeremy C Norris
*Assistant Examiner* — Nathan Milakovich
(74) *Attorney, Agent, or Firm* — Arent Fox LLP (57) ABSTRACT

A solid electrolyte capacitor in which a valve-acting metal substrate with a dielectric oxide film formed on the surface of an anode body is immersed alternately in a monomer solution and an oxidant solution to form a first conductive polymer layer on the surface of the dielectric oxide film. Thereafter, the capacitor element with the first conductive polymer layer is immersed in a soluble conductive polymer solution or a conductive polymer suspension to form a second conductive polymer layer that varies little in film thickness. Then, a cathode layer is formed on the conductive polymer layer.

9 Claims, 10 Drawing Sheets

(56) References Cited

U.S. PATENT DOCUMENTS

| | | | |
|---|---|---|---|
| 2008/0218942 A1* | 9/2008 | Yamagishi | H01G 9/0036 361/525 |
| 2011/0149476 A1* | 6/2011 | Saida | H01G 9/012 361/525 |
| 2012/0099242 A1* | 4/2012 | Ohyama | H01G 9/012 361/303 |
| 2012/0281338 A1* | 11/2012 | Lee | H01G 9/15 361/524 |

FOREIGN PATENT DOCUMENTS

| | | |
|---|---|---|
| JP | 2000-021686 A | 1/2000 |
| JP | 2002-025862 A | 1/2002 |
| JP | 2006-310365 A | 11/2006 |
| JP | 2008-053512 A | 3/2008 |
| JP | 2009-071085 A | 4/2009 |
| JP | 2010-278033 A | 12/2010 |
| JP | 2010278033 A * | 12/2010 |

* cited by examiner

SOLID ELECTROLYTIC CAPACITOR AND MANUFACTURING METHOD THEREFOR

BACKGROUND OF THE INVENTION

1. Field of the Invention

The present invention relates to a solid electrolyte capacitor including a conductive polymer layer on a dielectric oxide film layer on the surface of a valve-acting metal substrate, and a method for manufacturing the capacitor.

2. Description of the Related Art

Japanese Patent Laid-open Publication No. 2008-53512 is disclosed with reference to a method for manufacturing a solid electrolyte capacitor including a conductive polymer layer.

In Japanese Patent Laid-open Publication No. 2008-53512, a solid electrolyte capacitor is described which has a dielectric oxide film formed on the surface of a valve-acting metal substrate (anode body), a first conductive polymer layer formed by chemical polymerization on the surface of the dielectric oxide film, and further, a second conductive polymer layer formed with the use of a soluble conductive polymer solution on the surface of the first conductive polymer layer.

SUMMARY OF THE INVENTION

In the case of Japanese Patent Laid-open Publication No. 2008-53512, when the anode body with the dielectric oxide film formed is immersed in the soluble polymer solution, and then pulled up therefrom for forming the second conductive polymer layer, the lower end has a thickness increased by the influences of gravity and surface tension.

Figure 11A:
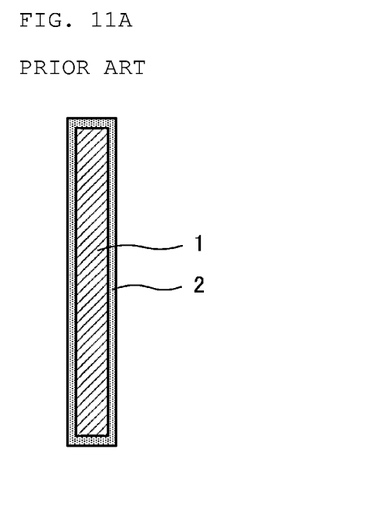
FIGS. 11A, 11B, 11C, and 11D are cross-sectional views schematically illustrating the film thickness of a second conductive polymer layer formed by a conventional manufacturing method.
Figure 11B:
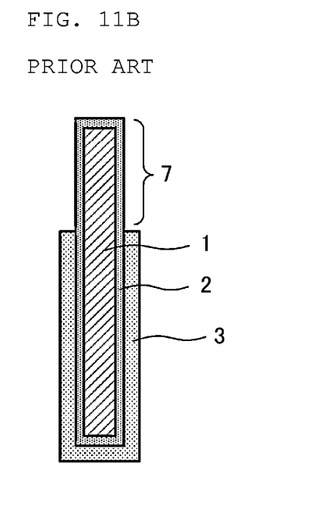
Figure 11C:
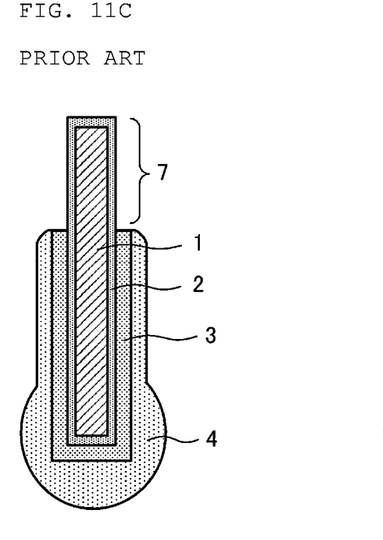
Figure 11D:
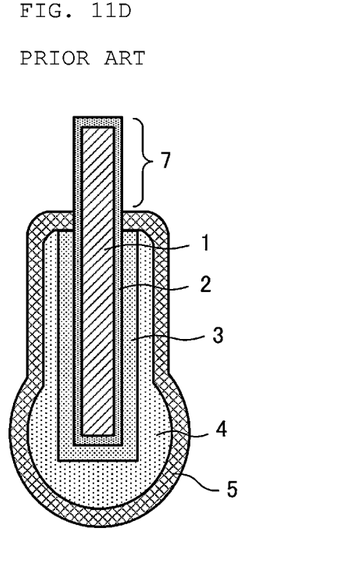

FIGS. 11A, 11B, 11C, and 11D are cross-sectional views schematically illustrating the film thickness of a second conductive polymer layer formed by immersing into and pulling up from a soluble conductive polymer solution. First, as shown in FIG. 11A, a valve-acting metal substrate is prepared which has a dielectric oxide film 2 formed by anodization on the surface of an anode body 1, and as shown in FIG. 11B, a first conductive polymer layer 3 is formed by chemical polymerization on the surface of the dielectric oxide film 2 of the valve-acting metal substrate. Then, the capacitor element with the first conductive polymer layer 3 formed is immersed into and pulled up from a soluble polymer solution to form a second conductive polymer layer 4 on the surface of the first conductive polymer layer 3 as shown in FIG. 11C, with a lower end of the capacitor element increased in thickness by the influences of the gravity (its own weight) and surface tension on the soluble polymer solution. Then, the capacitor element with the first conductive polymer layer 3 and second conductive polymer layer 4 formed is immersed in a paste bath for cathode formation, and dried. This step forms, as shown in FIG. 11D, a cathode layer 5 on the surface of the second conductive polymer layer 4 of the capacitor element.

It is to be noted that, as shown in FIG. 11A, the anode body 1 with the dielectric oxide film layer 2 formed on the surface thereof is referred to as a valve-acting metal substrate in this application. In addition, the valve-acting metal substrate with the first conductive polymer layer 3 formed as shown in FIG. 11B, with the second conductive polymer layer 4 formed on the surface of the first conductive polymer layer 3 as shown in FIG. 11C, or further with the cathode layer 5 formed as shown in FIG. 11D is all referred to as a capacitor element.

The lower end of the capacitor element, which is increased in thickness as described above, thus accounts for impeding the reduction in thickness for solid electrolyte capacitors configured by stacking a plurality of capacitor elements. In addition, the lower end of the capacitor element is unstable in thickness dimension, the lower end of the capacitor element varies widely in thickness dimension from lot to lot, and as a result, there has been a problem that the solid electrolyte capacitor varies widely in dimension.

An object of the present invention is to provide a solid electrolyte capacitor in which a conductive polymer layer varies little in film thickness, and a method for manufacturing the capacitor.

A solid electrolyte capacitor according to the present invention characteristically includes:

a valve-acting metal substrate having a dielectric oxide film layer formed on a surface of a porous anode body with a void section, and having an extraction electrode section;

a first conductive polymer layer formed on a surface of the dielectric oxide film layer, the first conductive polymer layer filling the void section of the valve-acting metal substrate, and having at least two deposited sections different in distance from the extraction electrode section on the surface of the dielectric oxide film layer; and a second conductive polymer layer formed on a surface of the first conductive polymer layer with the use of a soluble conductive polymer solution or a conductive polymer suspension.

Furthermore, the solid electrolyte capacitor is manufactured by a method including the steps of:

forming the first conductive polymer layer on the surface of the dielectric oxide film layer by immersing the valve-acting metal substrate alternately in a monomer solution and an oxidant solution, wherein the immersion time in the oxidant solution falls within 15 seconds; and forming the second conductive polymer layer on the surface of the first conductive polymer layer by immersing the valve-acting metal substrate with the first conductive polymer layer formed, in a soluble conductive polymer solution or a conductive polymer suspension.

According to the present invention, a thin solid electrolyte capacitor with small dimensional variations is achieved in which a conductive polymer layer varies little in film thickness.

DETAILED DESCRIPTION OF THE INVENTION

First Embodiment

A solid electrolyte capacitor has a capacitor element provided with each of a valve-acting metal substrate of a dielectric oxide film layer formed on the surface of an anode body, a conductive polymer layer, and a cathode layer, includes an anode conduction material electrically connected to the valve-acting metal substrate and a cathode conduction material electrically connected to the cathode layer, and has at least the capacitor element coated with an exterior resin. In addition, in order to obtain predetermined capacitance, multiple capacitor elements are stacked and connected in parallel, if necessary.

FIGS. 1A, 1B, 1C, and 1D are cross-sectional views at respective stages of a process for manufacturing a solid electrolyte capacitor according to a first embodiment. The respective steps will be described below with reference to these drawings.

(Dielectric Oxide Film Layer Formation Step)

Figure 1A:
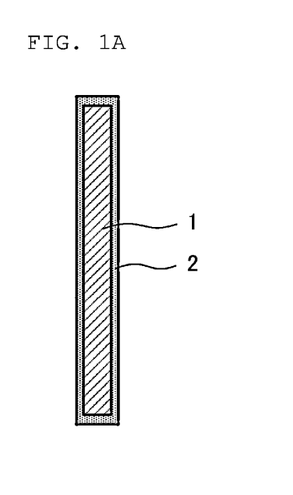
FIGS. 1A, 1B, 1C, and 1D are cross-sectional views at respective stages of a process for manufacturing a solid electrolyte capacitor according to a first embodiment.

FIG. 1A is a cross-sectional view of a valve-acting metal substrate with a dielectric oxide film layer 2 formed on the surface of an anode body 1. The valve-acting metal substrate is, for example, Al foil of 100 μm in thickness, with a dielectric oxide film 2 of an aluminum oxide ($Al_2O_3$) film formed on the surface of a valve-acting metal substrate 1 of an Al substrate. This Al foil has a surface made porous by etching, and the aluminum oxide film on the order of several nm to several tens nm is formed on the porous surface. This aluminum oxide film is formed by anodization of immersing the Al foil and the counter electrode in an aqueous ammonium adipate solution, and applying a predetermined voltage with the Al foil as an anode and the counter electrode as a cathode.

(First Conductive Polymer Layer Formation Step)

A valve-acting metal substrate with a dielectric oxide film formed on the surface of an anode body 1 is immersed alternately in a monomer solution and an oxidant solution to form a first conductive polymer layer on the surface of the dielectric oxide film.

Specifically, the anode body is immersed in a 32 wt % ethylene dioxythiophene solution in ethanol (monomer solution) for 60 seconds, then pulled up therefrom, and dried at room temperature for 5 minutes, and further immersed in an oxidant solution with 100.0 g of dopant and 60.3 g of ammonium persulfate dissolved in 70.1 g of water for 3 seconds, then pulled up therefrom, and left at room temperature for 15 minutes for drying and polymerization reaction progress. This Al foil is immersed in pure water for 5 minutes for washing, and dried in an oven at 105° C. for 10 minutes. The cycle of immersion in monomer solution and drying=>immersion in oxidant solution and drying=>washing and drying is repeated eight times.

Figure 1B:
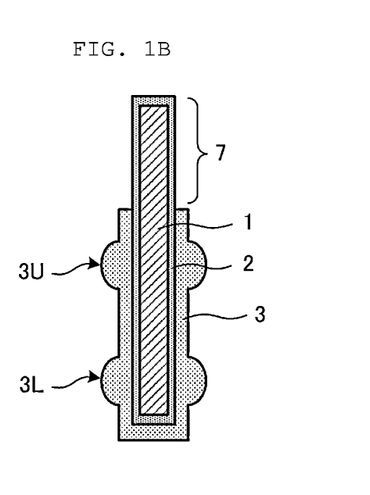
Figure 2:
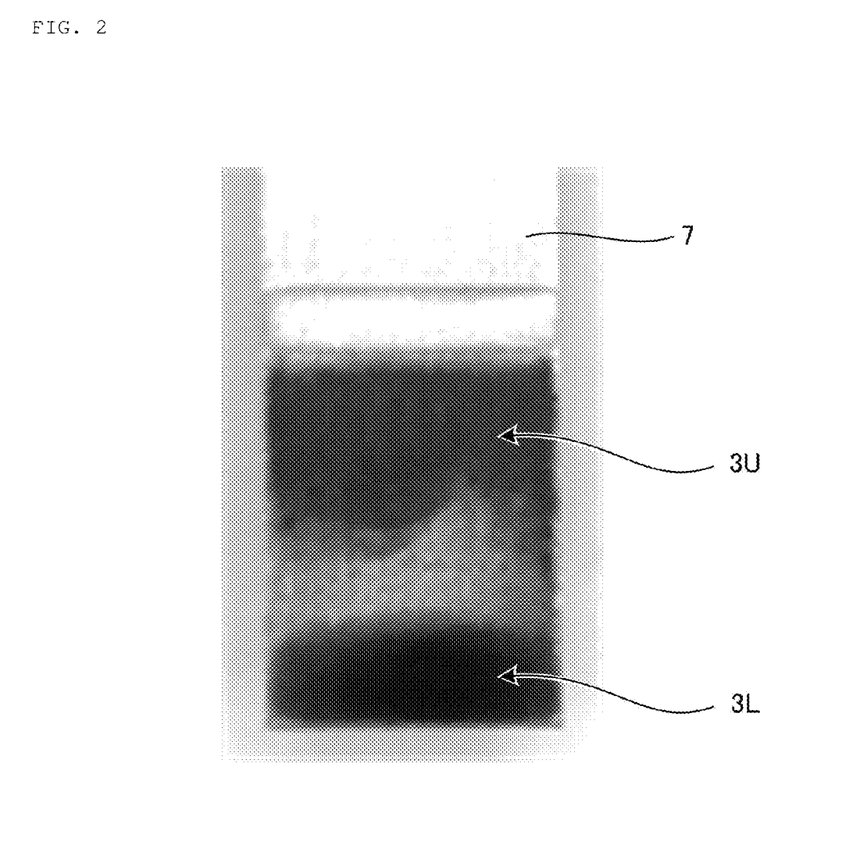
FIG. 2 is a plan view (photograph) after the formation of a first conductive polymer layer.

This step forms, as shown in FIG. 1B, an upper deposited section 3U and a lower deposited section 3L of a first conductive polymer layer 3 in positions that differ in distance from an extraction electrode section 7. FIG. 2 is a plan view (photograph) after the formation of the first conductive polymer layer.

It is to be noted that when the valve-acting metal substrate is pulled up and dried after the immersion in the monomer solution and the oxidant solution, a liquid accumulation is produced on a lower section of the capacitor element to form the lower deposited section 3L.

In addition, although the detailed factor that forms the upper deposited section 3U is not clear, it is presumed that because drying proceeds from an upper section of the capacitor element without any liquid accumulation in pulling up and drying the valve-acting metal substrate after the immersion in the monomer solution and oxidant solution, as the drying proceeds, the components of the oxidant solution are taken up by capillary action, and concentrated to form the upper deposited section 3U.

On the other hand, when the capacitor element is immersed in the oxidant solution after the immersion in the monomer solution, the monomer retained on the surface of the capacitor element is gradually dissolved to flow into the oxidant solution. In addition, the amount of the monomer retained on the surface of the capacitor element is smaller on an upper section of the capacitor element than on a lower section thereof, due to the action of gravity and surface tension. As a result, it is presumed that when the immersion time in the oxidant exceeds a certain period of time, the amount of the monomer retained on the upper section of the capacitor element is excessively decreased to form only the lower deposited section 3L without deposition on the upper section.

(Second Conductive Polymer Layer Formation Step)

The capacitor element with the first conductive polymer layer formed is immersed in a soluble conductive polymer solution or a conductive polymer suspension to form a second conductive polymer layer on the surface of the first conductive polymer layer.

Specifically, a process is repeated twice, in which the anode body with the first conductive polymer layer formed is immersed in a conductive polymer suspension containing polythiophene as its main constituent for 10 seconds, pulled up therefrom, and dried at 60° C. for 10 minutes, and finally a heat treatment is carried out at 150° C. for 30 minutes.

Figure 1C:
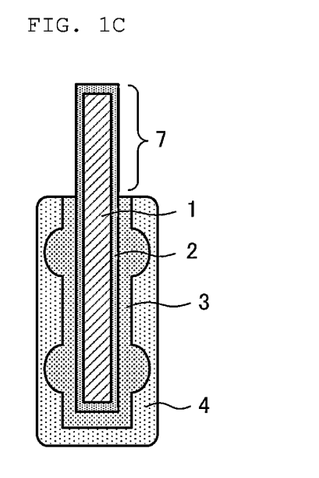
Figure 3:
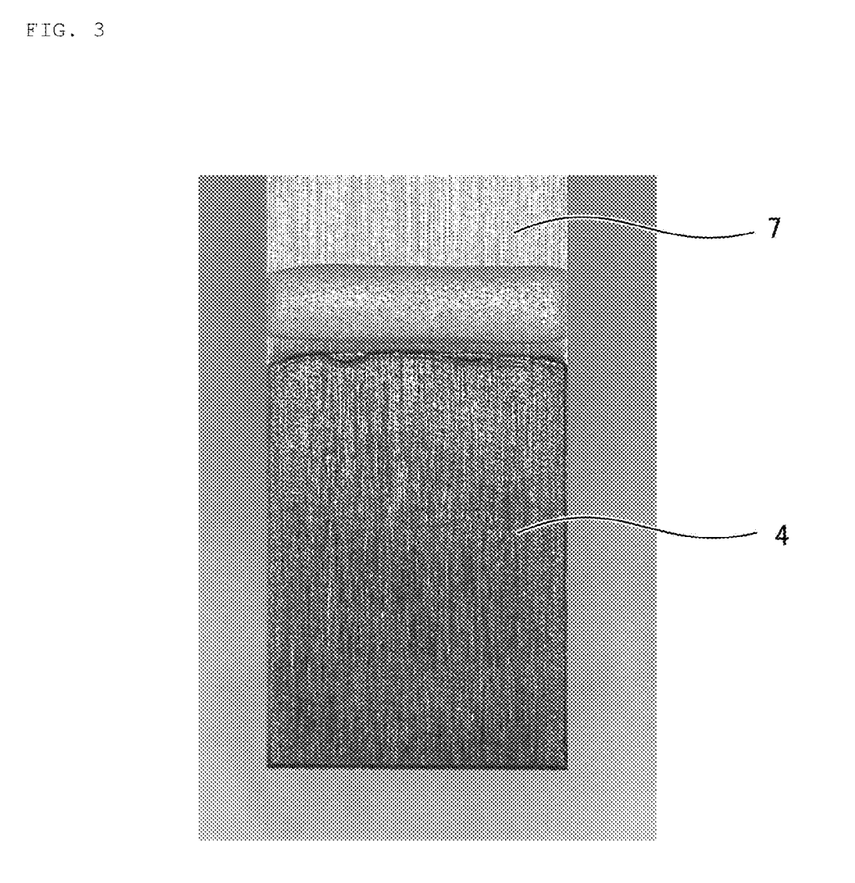
FIG. 3 is a plan view (photograph) after the formation of a second conductive polymer layer.

This step forms, as shown in FIG. 1C, a second conductive polymer layer 4 that varies little in film thickness, on the surface of the first conductive polymer layer 3. FIG. 3 is a plan view (photograph) after the formation of the second conductive polymer layer.

When the thickness after the formation of the second conductive polymer layer (the thickness of the first conductive polymer layer 3+the thickness of the second conductive polymer layer 4) is measured by a contact-type film thickness meter, the difference is 5 μm between the maximum thickness and the minimum thickness. The first conductive polymer layer 3 has the upper deposited section 3U and lower deposited section 3L formed as described above, and the tendency of the lower section to be swollen by the influences of its own weight and surface tension of the second conductive polymer layer 4 is reduced, resulting in an almost uniform surface.

While the conductive polymer suspension containing polythiophene as its main constituent is used in the example described above, a conductive polymer suspension containing polypyrrole as its main constituent and a soluble conductive polymer solution such as polyaniline may be also used. Also in this case, the same immersion time is adopted when the upper deposited section 3U and the lower deposited section 3L are formed.

It is to be noted that the method of measurement with the contact-type film thickness meter is as follows.

Measuring Instrument: Digimatic Indicator IDC-112B from Mitutoyo Corporation

Measurement Conditions: measuring the thicknesses of 9 points in total at both sides and the center of Al foil in each of an upper section, a central section, and a lower section of the Al foil, and regarding the average value as a measurement value.

Calculation Method: regarding (Measurement Value−Al Foil Thickness)/2 as the thickness of the conductive polymer layer.

In the present invention, the deposited sections of the first conductive polymer layer 3 refer to regions that are thicker by 1 μm or more in the case of the contact-type film thickness meter.

(Cathode Layer Formation Step)

A cathode layer is formed on the surface of the capacitor element with the second conductive polymer layer formed. Specifically, the capacitor element is immersed in a carbon paste and dried to form a carbon layer of 3 μm in thickness, and then immersed in a silver paste bath and dried to form a silver electrode layer of 20 μm in thickness. It is to be noted that the carbon layer and the silver electrode layer may be formed by a screen printing method or a spray coating method.

Figure 1D:
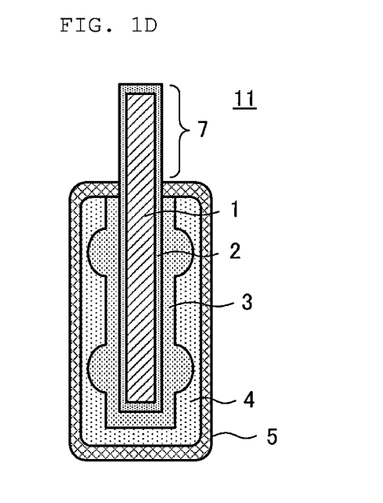

This step forms, as shown in FIG. 1D, a cathode layer 5 on the surface of the second conductive polymer layer 4 of the capacitor element.

Figure 4:
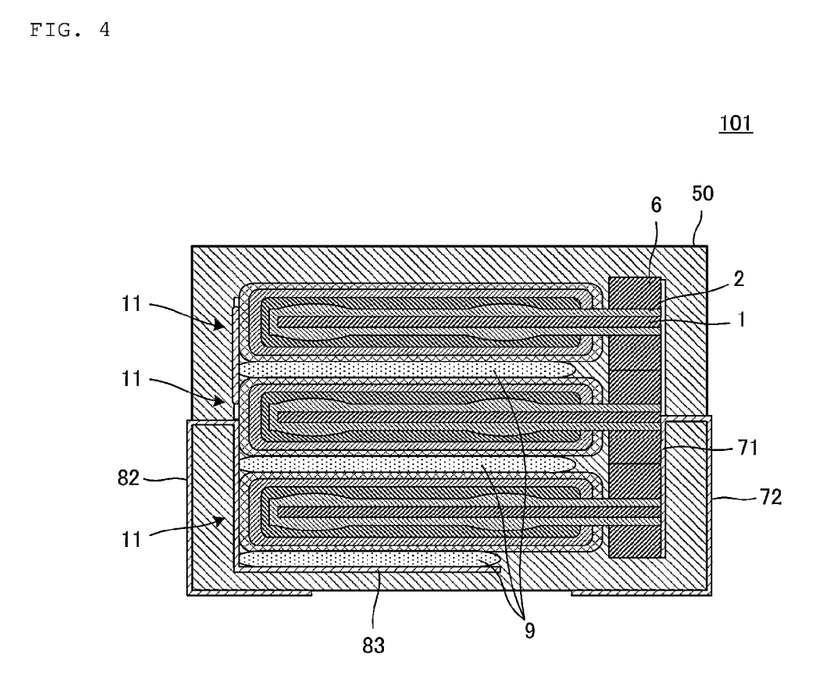
FIG. 4 is a cross-sectional view of a solid electrolyte capacitor 101.

The capacitor element 11 manufactured by the method described above is stacked on one another, and shaped as a chip component with a terminal formed on the outer surface. For example, FIG. 4 is a cross-sectional view of a solid electrolyte capacitor 101 including the capacitor element described above. In this example, three capacitor elements 11 are stacked on a cathode support 83.

The cathode support 83 and the capacitor element 11, and the respective capacitor elements 11 are joined to each other with an element bonding material 9 interposed therebetween.

For each capacitor element 11, a projecting section of the valve-acting metal substrate 1 coated with the dielectric oxide film layer 2 is provided with a spacer 6. In addition, the valve-acting metal substrates 1 for each capacitor element 11 are electrically connected to an anode abutment section 71.

A cathode external terminal 82 electrically connected to the cathode support 83 is exposed on the outer surface of an exterior resin 50. Furthermore, an anode external terminal 72 electrically connected to the anode abutment section 71 is exposed thereon.

As described above, due to small surface asperity of the capacitor element 11, in the case of stacking the multiple capacitor elements 11, stress concentration can be relaxed to prevent defects from being caused in the capacitor elements 11.

Second Embodiment (Dielectric Oxide Film Layer Formation Step)
The same as in the first embodiment.
(First Conductive Polymer Layer Formation Step)

The valve-acting metal substrate with the dielectric oxide film layer 2 formed on the surface of an anode body 1 is immersed in a 32 wt % ethylene dioxythiophene solution in ethanol (monomer solution) for 60 seconds, then pulled up therefrom, and dried at room temperature for 5 minutes, and further immersed in an oxidant solution with 100.0 g of dopant and 60.3 g of ammonium persulfate dissolved in 70.1 g of water for 15 seconds, then pulled up therefrom, and left at room temperature for 15 minutes for drying and polymerization reaction progress. This Al foil is immersed in pure water for 5 minutes for washing, and dried in an oven at 105° C. for 10 minutes. The cycle of immersion in monomer solution and drying=>immersion in oxidant solution and drying=>washing and drying is repeated eight times.

The difference from the first embodiment is the change of the immersion time in the oxidant solution to 15 seconds, rather than 3 seconds.

Figure 5:
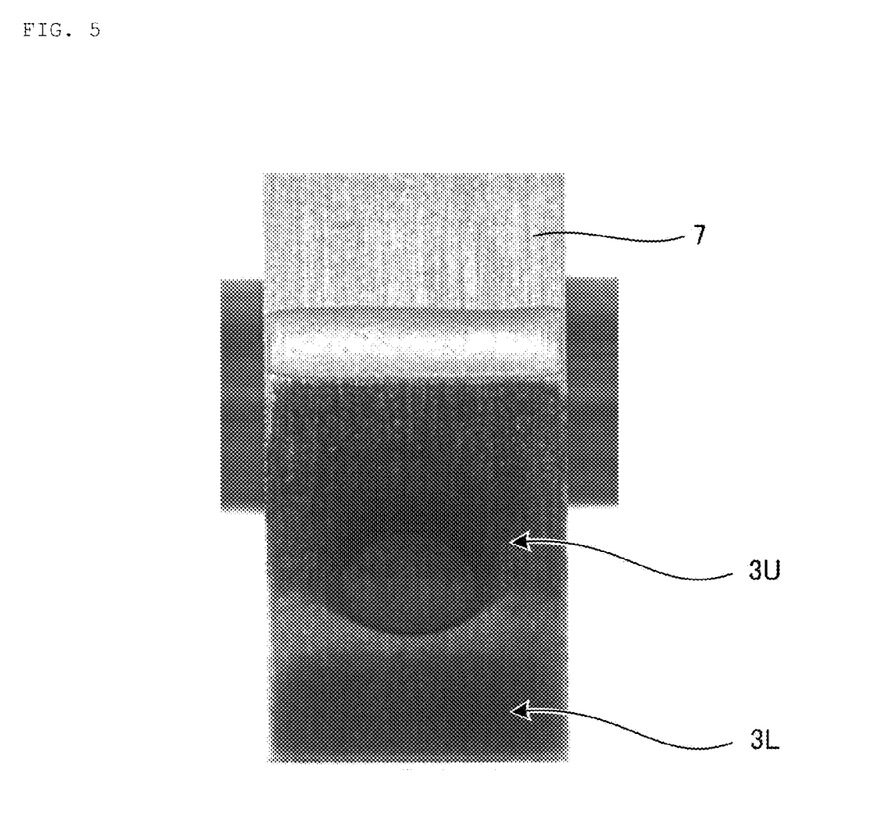
FIG. 5 is a plan view (photograph) after the formation of a first conductive polymer layer for a solid electrolyte capacitor according to a second embodiment.

FIG. 5 is a plan view (photograph) after the formation of the first conductive polymer layer. This step forms, as found in FIG. 5, an upper deposited section 3U and a lower deposited section 3L of a first conductive polymer layer in positions that differ in distance from an extraction electrode section 7.

(Second Conductive Polymer Layer Formation Step)

A process is repeated twice, in which the anode body with the first conductive polymer layer formed is immersed in a conductive polymer suspension containing polythiophene as its main constituent for 10 seconds, pulled up therefrom, and dried at 60° C. for 10 minutes, and finally a heat treatment is carried out at 150° C. for 30 minutes. This step is the same as described in the first embodiment. When the thickness after the formation of the second conductive polymer layer (the thickness of the first conductive polymer layer+the thickness of the second conductive polymer layer) is measured by a contact-type film thickness meter, the difference is 6 μm between the maximum thickness and the minimum thickness.

Figure 6:
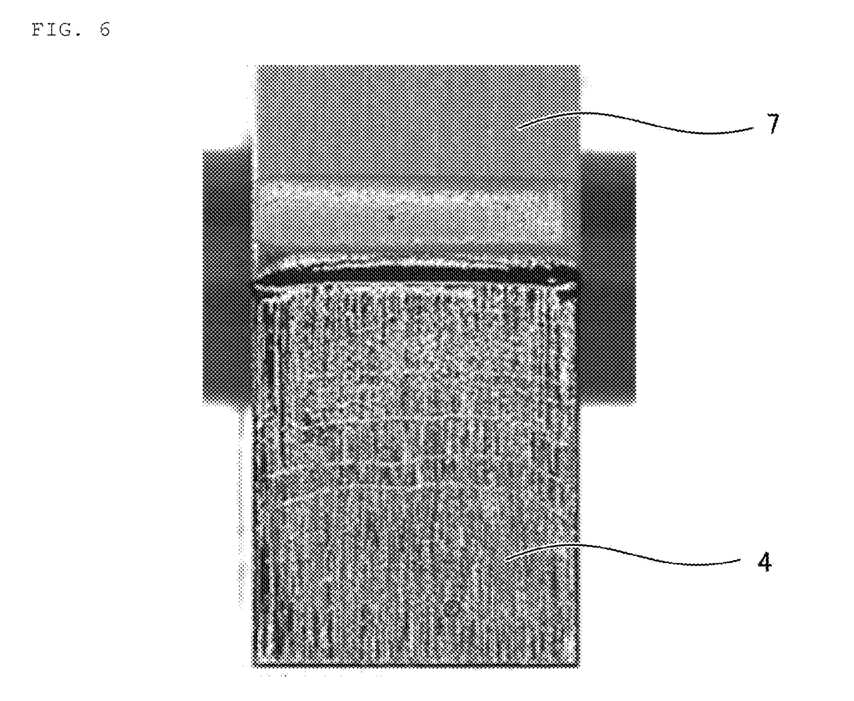
FIG. 6 is a plan view (photograph) after the formation of a second conductive polymer layer for the solid electrolyte capacitor according to the second embodiment.

FIG. 6 is a plan view (photograph) after the formation of the second conductive polymer layer. The first conductive polymer layer has the upper deposited section 3U and lower deposited section 3L formed, and the tendency of the lower section to be swollen by the influences of its own weight and surface tension of the second conductive polymer layer 4 is thus reduced, resulting in an almost uniform surface.

As described in the first and second embodiments, the immersion time in the oxidant solution is not limited to 3 seconds, and the immersion within 15 seconds forms the upper deposited section 3U and the lower deposited section 3L.

Comparative Example

FIGS. 8A, 8B, 8C, and 8D are cross-sectional views at respective stages of a process for manufacturing a solid electrolyte capacitor according to a comparative example.

(Dielectric Oxide Film Layer Formation Step)

Figure 8A:
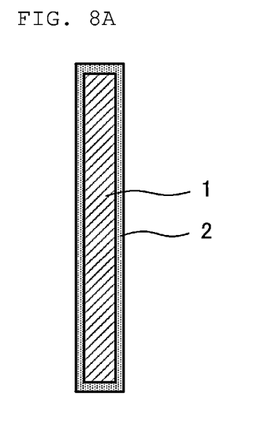
FIGS. 8A, 8B, 8C, and 8D are cross-sectional views at respective stages of a process for manufacturing a solid electrolyte capacitor according to a comparative example.

In the same way as in the first embodiment, a dielectric oxide film layer is formed on the surface of an anode body 1 as shown in FIG. 8A.

(First Conductive Polymer Layer Formation Step)

Figure 8B:
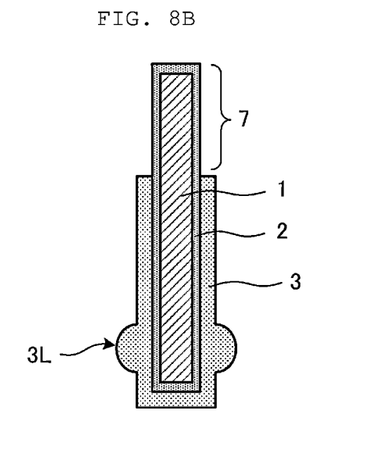
Figure 9:
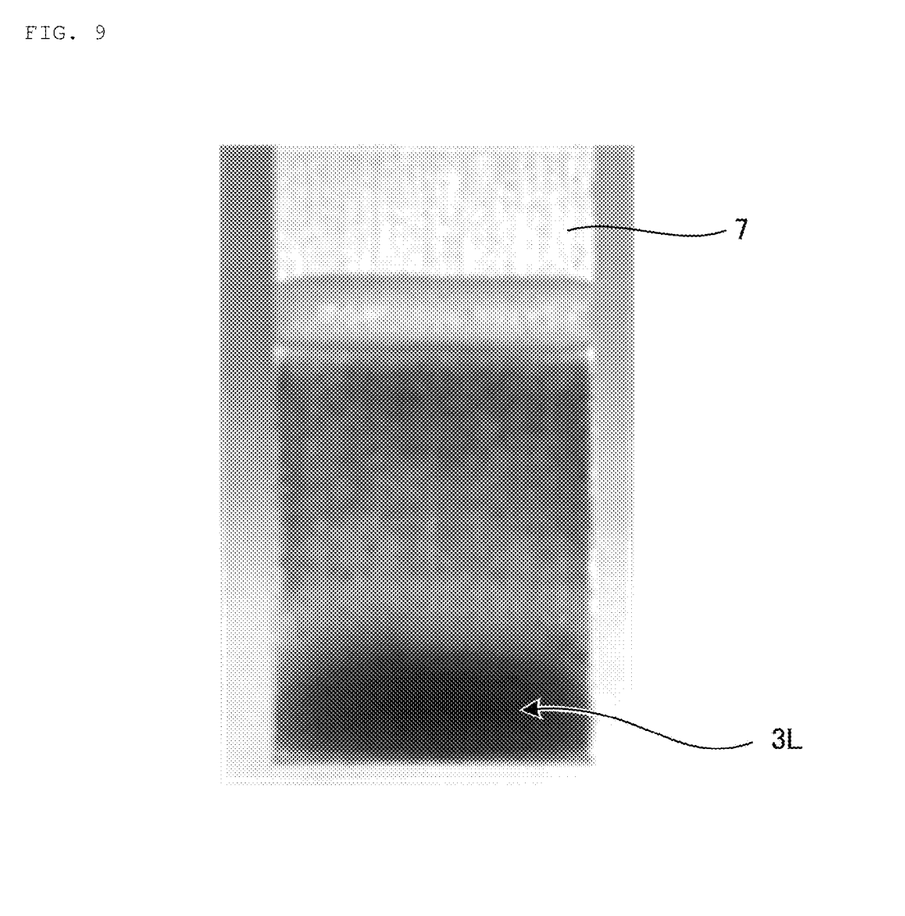
FIG. 9 is a plan view (photograph) after the formation of a first conductive polymer layer for the solid electrolyte capacitor according to the comparative example.

The step is carried out in the same way as in the first embodiment, except for the immersion time in the monomer solution and the immersion time in the oxidant solution adjusted to 60 seconds. This step forms, as shown in FIG. 8B, a lower deposited section 3L on a lower section of a first conductive polymer layer 3. FIG. 9 is a plan view (photograph) after the formation of the first conductive polymer layer.

(Second Conductive Polymer Layer Formation Step)

Figure 8C:
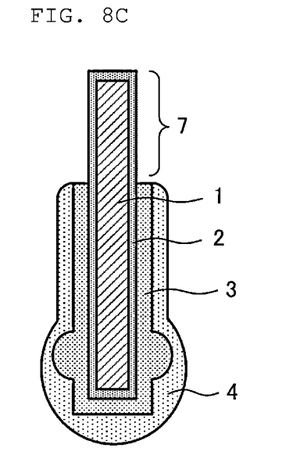
Figure 10:
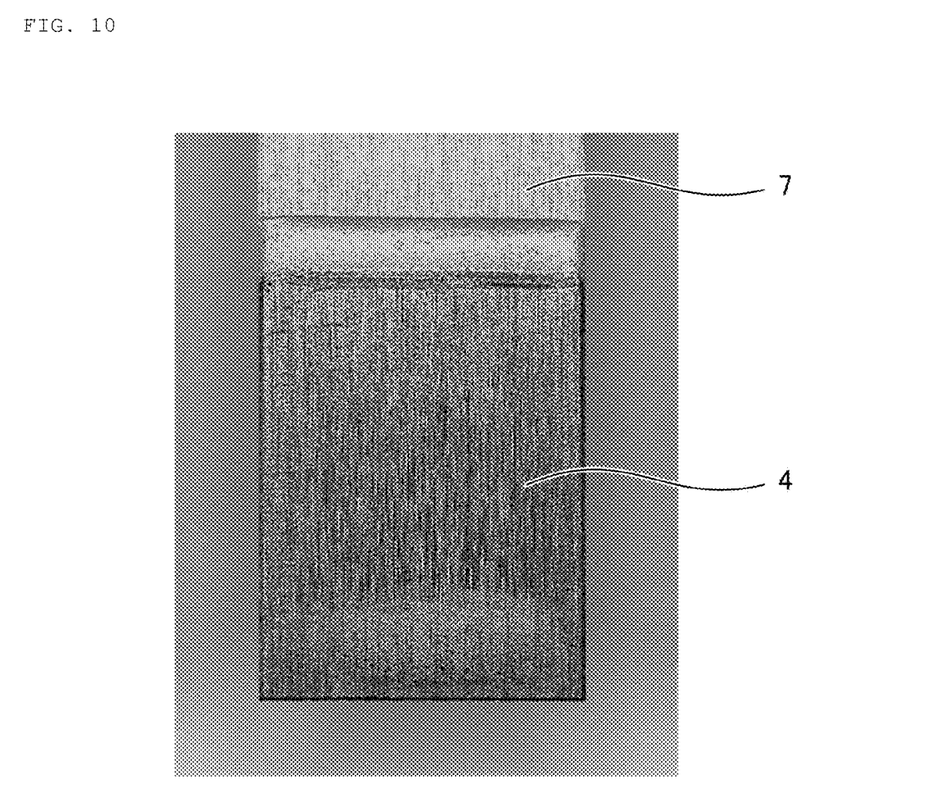
FIG. 10 is a plan view (photograph) after the formation of a second conductive polymer layer for the solid electrolyte capacitor according to the comparative example.

The same conditions are adopted as in the first embodiment. This step forms, as shown in FIG. 8C, a second conductive polymer layer 4 on the surface of the first conductive polymer layer 3. FIG. 10 is a plan view (photograph) after the formation of the second conductive polymer layer.

When the thickness after the formation of the second conductive polymer layer (the thickness of the first conductive polymer layer+the thickness of the second conductive polymer layer) is measured by a contact-type film thickness meter, the difference is 8 μm between the maximum thickness and the minimum thickness.

Figure 8D:
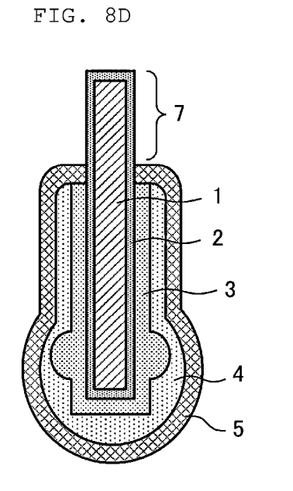

Then, in a cathode layer formation step, as shown in FIG. 8D, a cathode layer 5 is formed on the surface of the second conductive polymer layer 4 of the capacitor element.

As described above, when the immersion time in the oxidant solution exceeds 15 seconds in the formation of the first conductive polymer layer 3, the conductive polymer of the capacitor element is non-uniform in film thickness, which accounts for impeding the reduction in thickness, and increases the variation in thickness dimension.

Third Embodiment

Figure 7A:
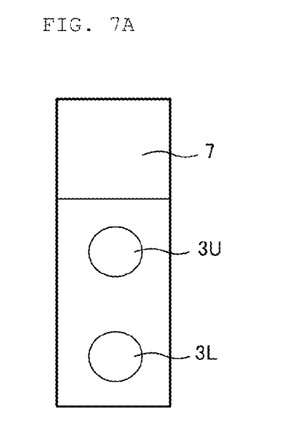
FIGS. 7A and 7B are plan views illustrating the positions of deposited sections for a solid electrolyte capacitor according to a third embodiment.
Figure 7B:
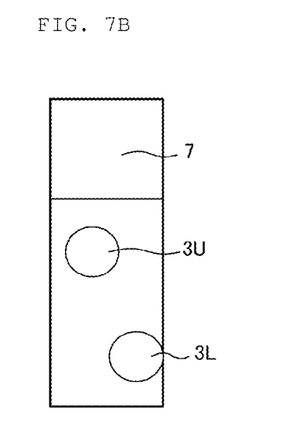

FIGS. 7A and 7B are plan views illustrating the positions of deposited sections for a solid electrolyte capacitor according to a third embodiment. While the upper deposited section 3U and lower deposited section 3L extending in the width direction in positions that differ in distance from the extraction electrode section 7 are formed in the examples shown in FIGS. 2 and 5, it is not always necessary that the sections extend over the entire width, and the sections may extend partially in the width direction and vertical direction as shown in FIG. 7A. More specifically, it is not always necessary to target conditions for immersion in an oxidant solution such that the deposited sections extend over the entire width. In addition, as shown in FIG. 7B, it is not always necessary for the upper deposited section 3U and the lower deposited section 3L to be bilaterally symmetric (symmetric with respect to a central line extending in the vertical direction).

What is claimed is:

1. A solid electrolyte capacitor comprising:
a valve-acting metal substrate having a dielectric oxide film layer on a surface of a porous anode body having a void section, the valve-acting metal substrate having six surfaces and an extraction electrode section;
a first conductive polymer layer on a surface of the dielectric oxide film layer and at least partially covering five of the six surfaces of the valve-acting metal substrate, the first conductive polymer layer filling the void section of the valve-acting metal substrate, and having at least two deposited sections different in distance from the extraction electrode section on the surface of the dielectric oxide film layer; and
a second conductive polymer layer on a surface of the first conductive polymer layer.

2. The solid electrolyte capacitor according to claim 1, wherein the second conductive polymer layer is formed on the surface of the first conductive polymer layer with the use of one of a soluble conductive polymer solution and a conductive polymer suspension.

3. The solid electrolyte capacitor according to claim 1, wherein the first conductive polymer layer is formed on the surface of the dielectric oxide film layer by alternate immersion in a monomer solution and an oxidant solution.

4. The solid electrolyte capacitor according to claim 1, further comprising a cathode layer on a surface of the second conductive polymer layer.

5. The solid electrolyte capacitor according to claim 1, wherein the valve-acting metal substrate is Al.

6. The solid electrolyte capacitor according to claim 1, wherein the at least two deposited sections different in distance from the extraction electrode section extend over an entire width of the dielectric oxide film layer.

7. The solid electrolyte capacitor according to claim 1, wherein the at least two deposited sections different in distance from the extraction electrode section do not extend over an entire width of the dielectric oxide film layer.

8. The solid electrolyte capacitor according to claim 7, wherein the at least two deposited sections different in distance from the extraction electrode section are not bilaterally symmetric with respect to a central line extending in a length direction of the dielectric oxide film layer.

9. The solid electrolyte capacitor according to claim 1, wherein at least one of the at least two deposited sections is a concentrate of an oxidant solution.

* * * * *